US008883035B2

(12) United States Patent
Miralles et al.

(10) Patent No.: US 8,883,035 B2
(45) Date of Patent: Nov. 11, 2014

(54) FORMULATION OF A WARE WASHING SOLID CONTROLLING HARDNESS

(75) Inventors: Altony J. Miralles, Woodbury, MN (US); Carter M. Silvernail, Burnsville, MN (US)

(73) Assignee: Ecolab USA Inc., Saint Paul, MN (US)

( * ) Notice: Subject to any disclaimer, the term of this patent is extended or adjusted under 35 U.S.C. 154(b) by 345 days.

(21) Appl. No.: 12/843,999

(22) Filed: Jul. 27, 2010

(65) Prior Publication Data
US 2011/0021403 A1    Jan. 27, 2011

Related U.S. Application Data

(63) Continuation-in-part of application No. 12/730,998, filed on Mar. 24, 2010, now abandoned, which is a continuation-in-part of application No. 12/510,035, filed on Jul. 27, 2009, now abandoned.

(51) Int. Cl.
   *C02F 5/02*    (2006.01)
   *C02F 5/14*    (2006.01)
   *C11D 3/04*    (2006.01)
   *C11D 3/10*    (2006.01)
   *C11D 3/36*    (2006.01)
   *C11D 3/37*    (2006.01)

(52) U.S. Cl.
   CPC . *C02F 5/14* (2013.01); *C11D 3/044* (2013.01); *C11D 3/10* (2013.01); *C11D 3/365* (2013.01); *C11D 3/3757* (2013.01)
   USPC .......................................................... 252/175

(58) Field of Classification Search
   USPC ......... 510/446, 222, 224, 298, 445, 346, 361, 510/398, 477, 533; 252/174, 175; 210/669
   See application file for complete search history.

(56) References Cited

U.S. PATENT DOCUMENTS

| | | | |
|---|---|---|---|
| 3,048,548 A | 8/1962 | Martin et al. | |
| 3,334,147 A | 8/1967 | Brunelle et al. | |
| 3,442,242 A | 5/1969 | Laskey et al. | |
| 4,255,259 A | 3/1981 | Hwa et al. | |
| 4,259,201 A | 3/1981 | Cockrell, Jr. et al. | |
| 4,306,991 A | 12/1981 | Hwa | |
| 4,407,722 A | 10/1983 | Davies et al. | |
| 4,432,879 A | 2/1984 | Greaves et al. | |
| 4,443,270 A | 4/1984 | Biard et al. | |
| 4,547,540 A | 10/1985 | Yeoman | |
| 4,556,493 A | 12/1985 | Cuisia | |
| 4,575,425 A | 3/1986 | Boffardi et al. | |
| 4,581,145 A | 4/1986 | Cuisia et al. | |
| 4,600,524 A | 7/1986 | Cuisia et al. | |
| 4,618,914 A | 10/1986 | Sato et al. | |
| 4,631,131 A | 12/1986 | Cuisia et al. | |
| 4,711,740 A | 12/1987 | Carter et al. | |
| 4,784,774 A | 11/1988 | Amjad et al. | |
| 4,830,773 A | 5/1989 | Olson | |
| 4,846,989 A | 7/1989 | Killa | |
| 4,846,993 A | 7/1989 | Lentsch et al. | |
| 4,908,148 A | 3/1990 | Caravajal et al. | |
| 4,919,845 A | 4/1990 | Vogt et al. | |
| 4,933,101 A | 6/1990 | Cilley et al. | |
| 4,936,987 A | 6/1990 | Persinski et al. | |
| 4,968,431 A * | 11/1990 | Bohnsack et al. ............ | 210/669 |
| 4,978,456 A | 12/1990 | Sprague | |
| 5,023,001 A | 6/1991 | Amjad et al. | |
| 5,061,396 A | 10/1991 | Lovine et al. | |
| 5,078,879 A | 1/1992 | Gill et al. | |
| 5,093,005 A | 3/1992 | Greaves | |
| 5,112,905 A | 5/1992 | Colombo et al. | |
| 5,152,921 A | 10/1992 | Weber et al. | |
| 5,200,105 A | 4/1993 | Cuisia | |
| 5,213,691 A | 5/1993 | Emmons et al. | |
| 5,232,760 A | 8/1993 | Calcaterra et al. | |
| 5,288,410 A | 2/1994 | Cuisia | |
| 5,348,786 A | 9/1994 | Calcaterra et al. | |
| 5,366,654 A | 11/1994 | Van Den Brom et al. | |
| 5,386,038 A | 1/1995 | Davis et al. | |
| 5,482,641 A | 1/1996 | Fleisher et al. | |
| 5,482,647 A | 1/1996 | Bolkan et al. | |
| 5,501,815 A | 3/1996 | Man | |
| 5,518,629 A | 5/1996 | Perez et al. | |
| 5,518,646 A | 5/1996 | Van Den Brom | |
| 5,545,348 A | 8/1996 | Savio | |
| 5,552,078 A | 9/1996 | Carr et al. | |
| 5,624,892 A | 4/1997 | Angevaare et al. | |
| 5,645,756 A | 7/1997 | Dubin et al. | |
| 5,733,856 A * | 3/1998 | Gopalkrishnan et al. ...... | 510/360 |
| 5,773,401 A | 6/1998 | Murata et al. | |
| 5,780,419 A | 7/1998 | Doumen et al. | |
| 5,849,095 A | 12/1998 | Rouillard | |
| 5,866,032 A | 2/1999 | Carey et al. | |
| 5,876,514 A | 3/1999 | Rolando et al. | |
| 5,925,610 A | 7/1999 | Austin et al. | |
| 5,977,047 A | 11/1999 | Carr | |
| 5,998,341 A | 12/1999 | Bhandary et al. | |
| 6,034,045 A | 3/2000 | Carr et al. | |
| 6,106,633 A | 8/2000 | Rouillard | |
| 6,150,324 A * | 11/2000 | Lentsch et al. ................ | 510/446 |
| 6,164,296 A | 12/2000 | Lentsch et al. | |

(Continued)

FOREIGN PATENT DOCUMENTS

| | | |
|---|---|---|
| GB | 2 332 443 A | 6/1999 |
| JP | 2002-012627 | 1/2002 |
| JP | 2004-217891 | 8/2004 |
| WO | WO98/30666 | 7/1998 |
| WO | WO 2008/013746 A1 | 1/2008 |

*Primary Examiner* — Monique Peets
(74) *Attorney, Agent, or Firm* — McKee, Voorhees & Sease

(57) ABSTRACT

A water hardness controlling agent includes a polyacrylic acid or salt thereof having a molecular weight of between about 1,000 and about 50,000 g/mol, an acrylic-maleic acid copolymer or salt thereof having a molecular weight of between about 1,000 and about 100,000 g/mol and a phosphonocarboxylic acid or salt thereof. A ratio of acrylic-maleic acid copolymer or salt thereof to polyacrylic acid or salt thereof to phosphonocarboxylic acid or salt thereof in parts per million is about 1-30:10-80:6-20.

6 Claims, No Drawings

(56) References Cited

U.S. PATENT DOCUMENTS

| | | |
|---|---|---|
| 6,172,028 B1 | 1/2001 | Baur et al. |
| 6,177,392 B1 | 1/2001 | Lentsch et al. |
| 6,257,253 B1 | 7/2001 | Lentsch et al. |
| 6,302,968 B1 | 10/2001 | Baum et al. |
| 6,344,434 B1 | 2/2002 | Matsuo et al. |
| 6,367,487 B1 | 4/2002 | Rouillard et al. |
| 6,395,813 B1 | 5/2002 | Duccini et al. |
| 6,410,495 B1 | 6/2002 | Lentsch et al. |
| 6,436,893 B1 | 8/2002 | Lentsch et al. |
| 6,444,771 B1 | 9/2002 | Yamaguchi et al. |
| 6,448,210 B1 | 9/2002 | Keyes et al. |
| 6,484,734 B1 | 11/2002 | Everson et al. |
| 6,489,278 B1 | 12/2002 | Lentsch et al. |
| 6,489,287 B1 | 12/2002 | Gauthier et al. |
| 6,503,400 B2 | 1/2003 | Kmec et al. |
| 6,503,879 B2 | 1/2003 | Lentsch et al. |
| 6,622,736 B1 | 9/2003 | Hahn |
| 6,664,219 B1 | 12/2003 | Lentsch et al. |
| 6,694,989 B2 | 2/2004 | Everson |
| 6,767,881 B1 | 7/2004 | Griese et al. |
| 6,806,245 B2 | 10/2004 | Hahn |
| 6,812,195 B2 | 11/2004 | Wierenga et al. |
| 6,825,159 B2 | 11/2004 | Man et al. |
| 6,835,706 B2 | 12/2004 | Lentsch et al. |
| 6,846,452 B2 | 1/2005 | Kmec et al. |
| 6,846,788 B2 | 1/2005 | Everson et al. |
| 6,900,167 B2 | 5/2005 | Griese et al. |
| 6,903,062 B2 | 6/2005 | Griese et al. |
| 6,916,773 B2 | 7/2005 | Griese et al. |
| 6,992,052 B2 | 1/2006 | Song |
| 7,008,911 B2 | 3/2006 | Griese et al. |
| 7,071,155 B2 | 7/2006 | Griese et al. |
| 7,094,740 B2 | 8/2006 | Berger et al. |
| 7,101,833 B2 | 9/2006 | Berger et al. |
| 7,135,448 B2 | 11/2006 | Lentsch et al. |
| 7,153,816 B2 | 12/2006 | Kessler et al. |
| 7,179,776 B2 | 2/2007 | Hahn |
| 7,196,044 B2 | 3/2007 | Smith et al. |
| 7,196,045 B2 | 3/2007 | Lentsch et al. |
| 7,219,675 B2 | 5/2007 | Brust |
| 7,241,726 B2 | 7/2007 | Song et al. |
| 7,271,138 B2 | 9/2007 | Song et al. |
| 7,276,470 B2 | 10/2007 | Hahn |
| 7,361,632 B2 | 4/2008 | Hahn |
| 7,390,776 B2 | 6/2008 | Tsumori et al. |
| 7,452,853 B2 | 11/2008 | Smith et al. |
| 7,456,142 B2 | 11/2008 | Hahn |
| 7,501,387 B2 | 3/2009 | Aihara et al. |
| 2003/0162685 A1 | 8/2003 | Man et al. |
| 2005/0096248 A1 | 5/2005 | Coke et al. |
| 2005/0153859 A1 | 7/2005 | Gohl et al. |
| 2005/0156141 A1 | 7/2005 | Corradini et al. |
| 2006/0040846 A1 | 2/2006 | Hoyt et al. |
| 2006/0135394 A1 | 6/2006 | Smith et al. |
| 2006/0234900 A1 | 10/2006 | Olson et al. |
| 2007/0017553 A1 | 1/2007 | Neplenbroek et al. |
| 2007/0072784 A1 | 3/2007 | Corradini et al. |
| 2008/0058239 A1 | 3/2008 | Evers et al. |
| 2008/0058240 A1 | 3/2008 | Evers et al. |
| 2008/0274930 A1 | 11/2008 | Smith et al. |
| 2008/0274932 A1 | 11/2008 | Smith et al. |
| 2008/0274939 A1 | 11/2008 | Monsrud et al. |
| 2008/0276967 A1 | 11/2008 | Smith et al. |
| 2008/0276973 A1 | 11/2008 | Miralles et al. |
| 2008/0287340 A1 | 11/2008 | Corradini |
| 2008/0300160 A1 | 12/2008 | Smith et al. |
| 2009/0038649 A1 | 2/2009 | Smith et al. |
| 2009/0054287 A1 | 2/2009 | Smith et al. |

* cited by examiner

FORMULATION OF A WARE WASHING SOLID CONTROLLING HARDNESS

CROSS-REFERENCE TO RELATED APPLICATION

The present application is a continuation-in-part application of U.S. patent application Ser. No. 12/730,998, entitled "Novel Formulation of a Ware Washing Solid Controlling Hardness," filed Mar. 24, 2010, which is a continuation-in-part application of U.S. patent application Ser. No. 12/510,035, entitled "Novel Formulation of a Ware Washing Solid Controlling Hardness", filed Jul. 27, 2009, which is incorporated herein by reference.

TECHNICAL FIELD

The present invention relates generally to the field of cleaning compositions. In particular, the present invention relates to cleaning compositions for controlling water hardness on surfaces of ware.

BACKGROUND

The level of water hardness, or amount of dissolved solids, in water can have deleterious effects in many systems. The term "dissolved solids" refers to the presence of calcium and magnesium in water. In general, hard water refers to water having a total dissolved solids (TDS) content in excess of about 200 ppm. However, hard water often has a TDS content in excess of about 400 ppm, and even in excess of about 800 ppm. Water having a molar ratio of calcium to magnesium greater than about 1:1 is also considered to be hard. Often, the molar ratio of calcium to magnesium in hard water is about 2:1 or about 3:1. Excess calcium in the water is known to attack other components of the cleaning composition and to precipitate into solution. Although most locations have hard water, water hardness tends to vary from one location to another.

When hard water is used in conjunction with cleaning compositions, hard water can cause precipitation, etching or corrosion of glass, staining of hard surfaces, or stabilization of bacteria. The hard water can cause precipitation of anionic surfactants in the cleaning composition being used, resulting in scaling on the surface being cleaned. For example, when hard water is included as part of the cleaning composition or as the water of dilution used to clean ware, spotting or filming may remain on the surface after cleaning. Exemplary surfaces that may be affected include, for example: glass, metal and plastic.

SUMMARY

In some aspects, the present invention relates to a water hardness controlling agent including a polyacrylic acid or salt thereof having a molecular weight of between about 1,000 and about 50,000 g/mol, an acrylic-maleic acid copolymer or salt thereof having a molecular weight of between about 1,000 and about 100,000 g/mol and a phosphonocarboxylic acid or salt thereof. A ratio of the acrylic-maleic acid copolymer or salt thereof to polyacrylic acid or salt thereof to phosphonocarboxylic acid or salt thereof in parts per million is about 1-30:10-80:6-20.

In other aspects, the present invention relates to cleaning compositions including an alkalinity source, a surfactant component and the water hardness controlling agent described above.

In yet other aspects, the present invention relates to methods of cleaning a surface. The method includes forming a water hardness controlling agent, adding at least one functional ingredient to the water hardness controlling agent to form a cleaning composition and applying the cleaning composition onto a hard surface. The water hardness controlling agent is formed by mixing an acrylate polymer having a molecular weight of between about 1,000 and about 50,000 g/mol, an acrylate-maleic copolymer having a molecular weight of between about 1,000 and about 100,000 g/mol and a phosphonocarboxylic acid or salt thereof to form a water hardness controlling agent.

While multiple aspects and embodiments are disclosed, still other aspects and embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The present invention relates to hardsurface cleaning compositions and methods of using the hardsurface cleaning compositions for controlling water hardness and protecting surfaces. In particular, the hardsurface cleaning compositions are useful for preventing spotting or filming on the surface of ware. The cleaning compositions include a water hardness controlling agent including a polyacrylic acid or salts thereof ("polyacrylic acid" or "acrylate polymer"), an acrylic-maleic acid copolymer or salts thereof ("acrylic-maleic acid copolymer" or "acrylate-maleic copolymer") and a phosphonocarboxylic acid or salts thereof ("phosphonocarboxylic acid"). The combination of these three components in specified ratios prevent the formation and deposition of scale on hard surfaces. Cleaning compositions including this water hardness controlling agent can be used in various industries, including, but not limited to: warewash (institutional and consumer), laundry, food and beverage, vehicle care, water care and textile care. In particular, the cleaning compositions can be safely used on glass, plastic and metal surfaces.

The cleaning compositions generally include a polyacrylic acid, an acrylic-maleic acid copolymer and a phosphonocarboxylic acid for controlling water hardness. The polyacrylic acid, acrylic-maleic acid copolymer and phosphonocarboxylic acid that make up the water hardness controlling agent function to prevent scale formation and deposition onto surfaces being cleaned with the cleaning composition. Without wishing to be bound by any particular theory, it is thought that the water hardness controlling agent performs this function by preventing the precipitation of calcium carbonate into solution.

The water hardness controlling agent can comprise, consist of, or consist essentially of a polyacrylic acid, an acrylic-maleic acid copolymer and a phosphonocarboxylic acid. A water hardness controlling agent consisting essentially of the listed ingredients does not include additional ingredients that, if present, would affect the water hardness controlling agent's ability to control water hardness and protect surfaces.

The cleaning composition can comprise, consist of, or consist essentially of the listed ingredients. A cleaning composition consisting essentially of the listed ingredients does not include additional ingredients that, if present, would affect the composition's ability to control water hardness and protect surfaces.

Examples of suitable polyacrylic acids include, but are not limited to, polyacrylic acids having a molecular weight of between about 1,000 to about 50,000 g/mol, particularly between about 1,000 and about 35,000 g/mol and more particularly between about 1,000 and about 15,000 g/mol. Examples of suitable commercially available polyacrylic acids include, but are not limited to, Acusol 445N and Acusol 445ND available from Dow Chemical Company, Midland, Mich. and Sokalan PA40, available from BASF Corporation, Florham Park, N.J. Acusol 445N and Acusol 445ND both have a molecular weight of about 4,500 g/mol and Sokalan PA40 has a molecular weight of about 15,000 g/mol. Examples of suitable acrylic-maleic acid copolymers include, but are not limited to, acrylic-maleic acid copolymers having a molecular weight of between about 1,000 to about 100,000 g/mol, particularly between about 1,000 and about 75,000 g/mol and more particularly between about 1,000 and about 50,000 g/mol. Examples of suitable commercially available acrylic-maleic acid copolymers include, but are not limited to, Acusol 505N and Acusol 448 available from Dow Chemical Company, Midland, Mich. and Sokalan CP5, available from BASF Corporation, Florham Park, N.J. Acusol 505N has a molecular weight of about 40,000 g/mol, Acusol 448 has a molecular weight of about 3,500 g/mol and Sokalan CP5 has a molecular weight of about 70,000 g/mol. An example of a suitable commercially available phosphonocarboxylic acid includes, but is not limited to, 2-phosphonobutane-1,2,4-tricarboxylic acid. An example of a suitable commercially available 2-phosphonobutane-1,2,4-tricarboxylic acid includes, but is not limited to, Bayhibit AM available from Mobay Chemical Co., Pittsburgh, Pa.

An exemplary formulation parameter of the invention is that the cleaning composition includes the polyacrylic acid, the acrylic-maleic acid copolymer and the phosphonocarboxylic acid at particular ratios. In one embodiment, the acrylic-maleic acid copolymer, the polyacrylic acid and the phosphonocarboxylic acid are present in the cleaning composition at a parts per million (ppm) ratio of about 1-30:10-80:6-20 with the acrylic-maleic acid copolymer and the polyacrylic acid being present in the cleaning composition at about 5 ppm and about 50 ppm, respectively, and particularly at about 15 and about 50 ppm, respectively. In particular, the acrylic-maleic acid copolymer, the polyacrylic acid and the phosphonocarboxylic acid are present in the cleaning composition at a ppm ratio of about 5-30:10-40:6-20. More particularly, the acrylic-maleic acid copolymer, the polyacrylic acid and the phosphonocarboxylic acid are present in the cleaning composition at a ppm ratio of about 5:40:8.

The cleaning composition also includes an alkalinity source, such as an alkali metal hydroxide, alkali metal carbonate, or alkali metal silicate. Examples of suitable alkalinity sources include, but are not limited to: sodium hydroxide, potassium hydroxide, sodium carbonate, potassium carbonate or a mixture of alkali metal hydroxide and alkali metal carbonate. Examples of particularly suitable alkalinity sources include, but are not limited to: sodium carbonate, sodium hydroxide, or a mixture of sodium carbonate and sodium hydroxide. The alkalinity source controls the pH of the resulting solution when water is added to the cleaning composition to form a use solution. The pH of the cleaning composition must be maintained in the alkaline range in order to provide sufficient detergency properties. In an exemplary embodiment, the pH of a use solution of the cleaning composition is between approximately 10 and approximately 12. If the pH of the cleaning composition is too low, for example, below approximately 10, the cleaning composition may not provide adequate detergency properties. If the pH of the cleaning composition is too high, for example, above approximately 12, the cleaning composition may become caustic and begin to attack the surface to be cleaned.

The cleaning compositions also include a surfactant component that functions primarily as a defoamer and as a wetting agent. A variety of surfactants may be used, including anionic, nonionic, cationic, and zwitterionic surfactants. For a discussion of surfactants, see Kirk-Othmer, Encyclopedia of Chemical Technology, Third Edition, volume 8, pages 900-912, which is incorporated herein by reference.

Examples of suitable anionic surfactants useful in the cleaning compositions include, but are not limited to: carboxylates such as alkylcarboxylates (carboxylic acid salts) and polyalkoxycarboxylates, alcohol ethoxylate carboxylates, nonylphenol ethoxylate carboxylates and the like; sulfonates such as alkylsulfonates, alkylbenzenesulfonates, alkylarylsulfonates, sulfonated fatty acid esters and the like; sulfates such as sulfated alcohols, sulfated alcohol ethoxylates, sulfated alkylphenols, alkylsulfates, sulfosuccinates, alkylether sulfates and the like. Some particularly suitable anionic surfactants include, but are not limited to: sodium alkylarylsulfonate, alpha-olefinsulfonate and fatty alcohol sulfates.

Nonionic surfactants useful in the cleaning compositions include those having a polyalkylene oxide polymer as a portion of the surfactant molecule. Examples of suitable nonionic surfactants include, but are not limited to: chlorine-, benzyl-, methyl-, ethyl-, propyl, butyl- and alkyl-capped polyethylene glycol ethers of fatty alcohols; polyalkylene oxide free nonionics such as alkyl polyglucosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates and the like; nonylphenol ethoxylate, polyoxyethylene glycol ethers and the like; carboxylic acid esters such as glycerol esters, polyoxyethylene esters, ethoxylated and glycol esters of fatty acids and the like; carboxylic amides such as diethanolamine condensates, monoalkanolamine condensates, polyoxyethylene fatty acid amides and the like; and polyalkylene oxide block copolymers including an ethylene oxide/propylene oxide block copolymer. Examples of suitable commercially available nonionic surfactants include, but are not limited to: PLURONIC, available from BASF Corporation, Florham Park, N.J. and ABIL B8852, available from Goldschmidt Chemical Corporation, Hopewell, Va.

Cationic surfactants useful for inclusion in the cleaning compositions include, but are not limited to: amines such as primary, secondary and tertiary amines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and naphthalene-substituted quaternary ammonium chlorides such as dimethyl-1-naphthylmethylammonium chloride. For a more extensive list of surfactants, see McCutcheon's Emulsifiers and Detergents, which is incorporated herein by reference.

The cleaning compositions also include water. It should be appreciated that the water may be provided as deionized water or as softened water The water provided as part of the concentrate can be relatively free of hardness. It is expected that the water can be deionized to remove a portion of the dissolved solids. Although deionized water is preferred for formulating the concentrate, the concentrate can be formulated with water that has not been deionized. That is, the concentrate can be formulated with water that includes dissolved solids, and can be formulated with water that can be characterized as hard water. When the cleaning composition is provided as a liquid, water makes up the balance of the cleaning composition. When the cleaning composition is provided as a solid, water is provided in an amount such that the amount of alkalinity source divided by the amount of water plus alkalinity source is equal to about 0.6 or greater.

In concentrate form, the cleaning compositions include between about 2.2 wt % and about 22 wt % polyacrylic acid, between about 0.1 wt % and about 20 wt % acrylic-maleic acid copolymer, between about 0.1 wt % and about 10 wt % phosphonocarboxylic acid, between about 10 wt % and about 80 wt % alkalinity source and up to about 3 wt % surfactant component. In particular, the cleaning compositions include between about 2.2 wt % and about 13 wt % polyacrylic acid, between about 0.1 wt % and about 11.5 wt % acrylic-maleic acid copolymer, between about 0.5 wt % and about 5 wt % phosphonocarboxylic acid, between about 20 wt % and about 60 wt % alkalinity source and between about 0.5 wt % and about 2 wt % surfactant component. More particularly, the cleaning compositions include between about 2.2 wt % and about 12 wt % polyacrylic acid, between about 0.1 wt % and about 5 wt % acrylic-maleic acid copolymer, between about 0.75 wt % and about 2.25 wt % phosphonocarboxylic acid, between about 30 wt % and about 50 wt % alkalinity source and between about 0.75 wt % and about 1.75 wt % surfactant component. In other embodiments, similar intermediate concentrations and use concentrations may also be present in the cleaning compositions of the invention.

In one embodiment, the cleaning compositions include less than approximately 0.55% phosphorous-containing compounds by weight. Particularly, the cleaning composition includes less than approximately 0.2% phosphorous-containing compounds by weight. More particularly, the cleaning composition includes less than approximately 0.1% phosphorous-containing compounds by weight.

Additional Functional Materials

The cleaning compositions can include additional components or agents, such as additional functional materials. As such, in some embodiments, the cleaning compositions including the polyacrylic acid, acrylic-maleic acid copolymer, phosphonocarboxylic acid, alkalinity source, surfactant component and water may provide a large amount, or even all of the total weight of the cleaning composition, for example, in embodiments having few or no additional functional materials disposed therein. The functional materials provide desired properties and functionalities to the cleaning composition. For the purpose of this application, the term "functional materials" include a material that when dispersed or dissolved in a use and/or concentrate solution, such as an aqueous solution, provides a beneficial property in a particular use. The cleaning compositions containing the polyacrylic acid, acrylic-maleic acid copolymer, phosphonocarboxylic acid, alkalinity source, surfactant component and water may optionally contain other soil-digesting components, surfactants, disinfectants, sanitizers, acidulants, complexing agents, corrosion inhibitors, foam inhibitors, dyes, thickening or gelling agents, and perfumes. Some particular examples of functional materials are discussed in more detail below, but it should be understood by those of skill in the art and others that the particular materials discussed are given by way of example only, and that a broad variety of other functional materials may be used.

Thickening Agents

Thickeners useful in the present invention include those compatible with alkaline systems. The viscosity of the cleaning compositions increases with the amount of thickening agent, and viscous compositions are useful for uses where the cleaning composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt % to about 3 wt %, from about 0.1 wt % to about 2 wt %, or about 0.1 wt % to about 0.5 wt %.

Dyes and Fragrances

Various dyes, odorants including perfumes, and other aesthetic enhancing agents may also be included in the cleaning compositions. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Pylakor Acid Bright Red (Pylam), and the like. Fragrances or perfumes that may be included in the compositions include, for example, terpenoids such as citronellol, aldehydes such as amyl cinnamaldehyde, a jasmine such as C1S-jasmine or jasmal, vanillin, and the like.

Rinse Aids

The cleaning compositions can optionally include a rinse aid composition, for example a rinse aid formulation containing a wetting or sheeting agent combined with other optional ingredients in a solid composition made using the binding agent. The rinse aid components are capable of reducing the surface tension of the rinse water to promote sheeting action and/or to prevent spotting or streaking caused by beaded water after rinsing is complete, for example in warewashing processes. Examples of sheeting agents include, but are not limited to: polyether compounds prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule.

Bleaching Agents

The cleaning compositions can optionally include a bleaching agent for lightening or whitening a substrate, and can include bleaching compounds capable of liberating an active halogen species, such as $Cl_2$, $Br_2$, —OCl— and/or —OBr—, or the like, under conditions typically encountered during the cleansing process. Examples of suitable bleaching agents include, but are not limited to: chlorine-containing compounds such as chlorine, a hypochlorite or chloramines. Examples of suitable halogen-releasing compounds include, but are not limited to: alkali metal dichloroisocyanurates, alkali metal hypochlorites, monochloramine, and dichloroamine. Encapsulated chlorine sources may also be used to enhance the stability of the chlorine source in the composition (see, for example, U.S. Pat. Nos. 4,618,914 and 4,830,773, the disclosures of which are incorporated by reference herein). The bleaching agent may also include an agent containing or acting as a source of active oxygen. The active oxygen compound acts to provide a source of active oxygen and may release active oxygen in aqueous solutions. An active oxygen compound can be inorganic, organic or a mixture thereof. Examples of suitable active oxygen compounds include, but are not limited to: peroxygen compounds, peroxygen compound adducts, hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine.

Sanitizers/Anti-Microbial Agents

The cleaning compositions can optionally include a sanitizing agent (or antimicrobial agent). Sanitizing agents, also known as antimicrobial agents, are chemical compositions that can be used to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, anilides, organosulfur and sulfur-nitrogen compounds and miscellaneous compounds.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Examples of suitable antimicrobial agents include, but are not limited to, phenolic antimicrobials such as pentachlorophenol; orthophenylphenol; chloro-p-benzylphenols; p-chloro-m-xylenol; quaternary ammonium compounds such as alkyl dimethylbenzyl ammonium chloride; alkyl dimethylethylbenzyl ammonium chloride; octyl decyldimethyl ammonium chloride; dioctyl dimethyl ammonium chloride; and didecyl dimethyl ammonium chloride. Examples of suitable halogen containing antibacterial agents include, but are not limited to: sodium trichloroisocyanurate, sodium dichloro isocyanate (anhydrous or dihydrate), iodine-poly(vinylpyrrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, and tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action.

Complexing Agents

In some embodiments, the cleaning compositions can optionally include a complexing agent. The complexing agent can include an organic complexing agent, an inorganic complexing agent, and mixtures thereof. Inorganic complexing agents include, but are not limited to, such compounds as sodium pyrophosphate, and sodium tripolyphosphate. Organic complexing agents include, but are not limited to, both polymeric and small molecule complexing agents. Polymeric complexing agents can include ionomer compositions such as polyacrylic acids compounds. Small molecule organic complexing agents include amino-carboxylates, including but not limited to, salts of ethylenediaminetetracetic acid (EDTA) and hydroxyethylenediaminetetracetic acid, nitrilotriacetic acid, ethylenediaminetetrapropionates, triethylenetetraminehexacetates, glutamic acid-N,N-diacetic acid tetrasodium salt, and methylglycinediacetic acid trisodium salt. The aminocarboxylates can be used in either the acid or the salt forms, for example, alkali metal ammonium and substituted ammonium salts. Examples of suitable commercially available aminocarboxylates include, but are not limited to, Dissolvine® GL, commercially available from Akzo Nobel, and Trilon M®, commercially available from BASF. Phosphonates are also suitable for use as complexing agents in the compositions of the invention and include, but are not limited to ethylenediamine tetra(methylenephosphonate), nitrilotrismethylenephosphonate, diethylenetriaminepenta (methylene phosphonate), hydroxyethylidene diphosphonate, and combinations thereof.

In some embodiments, the cleaning compositions include a complexing agent at between about 0.001 wt % and about 80 wt %, between about 0.1 wt % and about 50 wt %, or between about 1.0 wt % and about 30 wt %.

Activators

In some embodiments, the antimicrobial activity or bleaching activity of the cleaning compositions can be enhanced by the addition of a material which, when the cleaning composition is placed in use, reacts with the active oxygen to form an activated component. For example, in some embodiments, a peracid or a peracid salt is formed. For example, in some embodiments, tetraacetylethylene diamine can be included within the detergent composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof. In some embodiments, an activator for an active oxygen compound combines with the active oxygen to form an antimicrobial agent.

In some embodiments, the cleaning compositions are in the form of a solid block, and an activator material for the active oxygen is coupled to the solid block. The activator can be coupled to the solid block by any of a variety of methods for coupling one solid detergent composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the detergent composition, such as by a plastic or shrink wrap or film.

Builders or Fillers

The cleaning compositions can optionally include a minor but effective amount of one or more of a filler which does not necessarily perform as a cleaning agent per se, but may cooperate with a cleaning agent to enhance the overall cleaning capacity of the composition. Examples of suitable fillers include, but are not limited to: sodium sulfate, sodium chloride, starch, sugars, and C1-C10 alkylene glycols such as propylene glycol.

pH Buffering Agents

Additionally, the cleaning compositions can be formulated such that during use in aqueous operations, for example in aqueous cleaning operations, the wash water will have a desired pH. For example, a souring agent may be added to the cleaning composition such that the pH of the textile approximately matches the proper processing pH. The souring agent is a mild acid used to neutralize residual alkalines and reduce the pH of the textile such that when the garments come into contact with human skin, the textile does not irritate the skin. Examples of suitable souring agents include, but are not limited to: phosphoric acid, formic acid, acetic acid, hydrofluorosilicic acid, saturated fatty acids, dicarboxylic acids, tricarboxylic acids, and any combination thereof. Examples of saturated fatty acids include, but are not limited to: those having 10 or more carbon atoms such as palmitic acid, stearic acid, and arachidic acid (C20). Examples of dicarboxylic acids include, but are not limited to: oxalic acid, tartaric acid, glutaric acid, succinic acid, adipic acid, and sulfamic acid. Examples of tricarboxylic acids include, but are not limited to: citric acid and tricarballylic acids. Examples of suitable commercially available souring agents include, but are not limited to: TurboLizer, Injection Sour, TurboPlex, AdvaCare 120 Sour, AdvaCare 120 Sanitizing Sour, CarboBrite, and Econo Sour, all available from Ecolab Inc., St. Paul, Minn.

Fabric Relaxants

A fabric relaxant may be added to the cleaning compositions to increase the smoothness appearance of the surface of the textile.

Fabric Softeners

A fabric softener may also be added to the cleaning compositions to soften the feel of the surface of the textile. An example of a suitable commercially available fabric softener includes, but is not limited to, TurboFresh, available from Ecolab Inc., St. Paul, Minn.

Soil Releasing Agents

The cleaning compositions can include soil releasing agents that can be provided for coating the fibers of textiles to reduce the tendency of soils to attach to the fibers. Examples of suitable commercially available soil releasing agents include, but are not limited to: polymers such as Repel-O-Tex SRP6 and Repel-O-Tex PF594, available from Rhodia, Cranbury, N.J.; TexaCare 100 and TexaCare 240, available from Clariant Corporation, Charlotte, N.C.; and Sokalan HP22, available from BASF Corporation, Florham Park, N.J.

Defoaming Agents

The cleaning compositions can optionally include a minor but effective amount of a defoaming agent for reducing the stability of foam. Examples of suitable defoaming agents include, but are not limited to: silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No 3,334,147 to Brunelle et al., and U.S. Pat. No 3,442, 242 to Rue et al., the disclosures of which are incorporated by reference herein.

Anti-Redeposition Agents

The cleaning compositions can optionally include an anti-redeposition agent capable of facilitating sustained suspension of soils in a cleaning solution and preventing the removed soils from being redeposited onto the substrate being cleaned. Examples of suitable anti-redeposition agents include, but are not limited to: fatty acid amides, fluorocarbon surfactants, complex phosphate esters, polyacrylates, styrene maleic anhydride copolymers, and cellulosic derivatives such as hydroxyethyl cellulose, hydroxypropyl cellulose.

Stabilizing Agents

The cleaning compositions may also include stabilizing agents. Examples of suitable stabilizing agents include, but are not limited to: borate, calcium/magnesium ions, propylene glycol, and mixtures thereof.

Dispersants

The cleaning compositions may also include dispersants. Examples of suitable dispersants that can be used in the solid detergent composition include, but are not limited to: maleic acid/olefin copolymers, polyacrylic acid, and mixtures thereof.

Optical Brighteners

The cleaning compositions can optionally include an optical brightener, also referred to as a fluorescent whitening agent or a fluorescent brightening agent, and can provide optical compensation for the yellow cast in fabric substrates.

Fluorescent compounds belonging to the optical brightener family are typically aromatic or aromatic heterocyclic materials often containing a condensed ring system. A feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (naphthalamides, triazines, etc.). The choice of optical brighteners for use in compositions will depend upon a number of factors, such as the type of composition, the nature of other components present in the composition, the temperature of the wash water, the degree of agitation, and the ratio of the material washed to the tub size. The brightener selection is also dependent upon the type of material to be cleaned, e.g., cottons, synthetics, etc. Because most laundry detergent products are used to clean a variety of fabrics, the detergent compositions may contain a mixture of brighteners which are effective for a variety of fabrics. It is of course necessary that the individual components of such a brightener mixture be compatible.

Examples of suitable optical brighteners are commercially available and will be appreciated by those skilled in the art. At least some commercial optical brighteners can be classified into subgroups, including, but are not limited to: derivatives of stilbene, pyrazoline, carboxylic acid, methinecyanines, dibenzothiophene-5,5-dioxide, azoles, 5- and 6-membered-ring heterocycles, and other miscellaneous agents. Examples of particularly suitable optical brightening agents include, but are not limited to: distyryl biphenyl disulfonic acid sodium salt, and cyanuric chloride/diaminostilbene disulfonic acid sodium salt. Examples of suitable commercially available optical brightening agents include, but are not limited to: Tinopal 5 BM-GX, Tinopal CBS-CL, Tinopal CBS-X, and Tinopal AMS-GX, available from Ciba Specialty Chemicals Corporation, Greensboro, N.C. Examples of optical brighteners are also disclosed in "The Production and Application of Fluorescent Brightening Agents", M. Zahradnik, Published by John Wiley & Sons, New York (1982), the disclosure of which is incorporated herein by reference.

Suitable stilbene derivatives include, but are not limited to: derivatives of bis(triazinyl)amino-stilbene, bisacylamino derivatives of stilbene, triazole derivatives of stilbene, oxadiazole derivatives of stilbene, oxazole derivatives of stilbene, and styryl derivatives of stilbene.

Anti-Static Agents

The cleaning compositions can include an anti-static agent such as those commonly used in the laundry drying industry to provide anti-static properties. Anti-static agents can generate a percent static reduction of at least about 50% when compared with a textile that is not subjected to treatment. The percent static reduction can be greater than 70% and it can be greater than 80%. An example of an anti-static agent includes, but is not limited to, an agent containing quaternary groups.

Anti-Wrinkling Agents

The cleaning compositions can include anti-wrinkling agents to provide anti-wrinkling properties. Examples of anti-wrinkling suitable agents include, but are not limited to: siloxane or silicone containing compounds and quaternary ammonium compounds. Particularly suitable examples of anti-wrinkling agents include, but are not limited to: polydimethylsiloxane diquaternary ammonium, silicone copolyol fatty quaternary ammonium, and polydimethyl siloxane with polyoxyalkylenes. Examples of commercially available anti-wrinkling agents include, but are not limited to: Rewoquat SQ24, available from Degussa/Goldschmidt Chemical Corporation, Hopewell, Va.; Lube SCI-Q, available from Lambert Technologies; and Tinotex CMA, available from Ciba Specialty Chemicals Corporation, Greensboro, N.C.

Odor-Capturing Agents

The cleaning compositions can include odor capturing agents. In general, odor capturing agents are believed to function by capturing or enclosing certain molecules that provide an odor. Examples of suitable odor capturing agents include, but are not limited to: cyclodextrins and zinc ricinoleate.

Fiber Protection Agents

The cleaning compositions can include fiber protection agents that coat the fibers of the textile to reduce or prevent disintegration and/or degradation of the fibers. An example of a fiber protection agent includes, but is not limited to, cellulosic polymers.

Color Protection Agents

The cleaning compositions can include color protection agents for coating the fibers of a textile to reduce the tendency of dyes to escape the textile into water. Examples of suitable color protection agents include, but are not limited to: quaternary ammonium compounds and surfactants. Examples of particularly suitable color protection agents include, but are not limited to: di-(nortallow carboxyethyl)hydroxyethyl methyl ammonium methylsulfate and cationic polymers. Examples of commercially available surfactant color protection agents include, but are not limited to: Varisoft WE 21 CP and Varisoft CCS-1, available from Degussa/Goldschmidt Chemical Corporation, Hopewell, Va.; Tinofix CL from Ciba Specialty Chemicals Corporation, Greensboro, N.C.; Color Care Additive DFC 9, Thiotan TR, Nylofixan P-Liquid, Polymer VRN, Cartaretin F-4, and Cartaretin F-23, available from Clariant Corporation, Charlotte, N.C.; EXP 3973 Polymer, available from Alcoa Inc., Pittsburgh, Pa.; and Coltide, available from Croda International Plc, Edison N.J.

UV Protection Agents

The cleaning compositions can include a UV protection agent to provide the fabric with enhanced UV protection. In the case of clothing, it is believed that by applying UV protection agents to the clothing, it is possible to reduce the harmful effects of ultraviolet radiation on skin provided underneath the clothing. As clothing becomes lighter in weight, UV light has a greater tendency to penetrate the clothing and the skin underneath the clothing may become sunburned. An example of a suitable commercially available UV protection agent includes, but is not limited to, Tinosorb FD, available from Ciba Specialty Chemicals Corporation, Greensboro, N.C.

Anti-Pilling Agents

The cleaning compositions can include an anti-pilling agent that acts on portions of fibers that stick out or away from the fiber. Anti-pilling agents can be available as enzymes such as cellulase enzymes. Examples of commercially available anti-pilling agents include, but are not limited to: Puradex, available from Genencor International, Pal Alto, Calif.; and Endolase and Carezyme, available from Novozyme, Franklinton, N.C.

Water Repellency Agents

The cleaning compositions can include water repellency agents that can be applied to textile to enhance water repellent properties. Examples of stuiable water repellenancy agents include, but are not limited to: perfluoroacrylate copolymers, hydrocarbon waxes, and polysiloxanes.

Hardening Agents/Solubility Modifiers

The cleaning compositions may include a minor but effective amount of a hardening agent. Examples of suitable hardening agents include, but are not limited to: an amide such stearic monoethanolamide or lauric diethanolamide, an alkylamide, a solid polyethylene glycol, a solid EO/PO block copolymer, starches that have been made water-soluble through an acid or alkaline treatment process, and various inorganics that impart solidifying properties to a heated composition upon cooling. Such compounds may also vary the solubility of the composition in an aqueous medium during use such that the cleaning agent and/or other active ingredients may be dispensed from the solid composition over an extended period of time.

Adjuvants

The cleaning compositions can also include any number of adjuvants. Specifically, the cleaning composition can include stabilizing agents, wetting agents, foaming agents, corrosion inhibitors, biocides or hydrogen peroxide among any number of other constituents which can be added to the composition. Such adjuvants can be pre-formulated with the present composition or added to the system simultaneously, or even after, the addition of the present composition. The cleaning composition can also contain any number of other constituents as necessitated by the application, which are known and which can facilitate the activity of the present compositions.

Embodiments of the Present Compositions

Exemplary concentrate compositions of the cleaning compositions are provided in the following table.

TABLE 1

Exemplary Compositions

| Component | Range (Wt %) | Range (Wt %) | Range (Wt %) |
|---|---|---|---|
| Polyacrylate Polymer (45%) | 2.2-22.2 | 2.2-13 | 2.22-12 |
| Acrylate-Maleic Copolymer | 0.1-20 | 0.1-11.5 | 0.1-5 |
| Phosphonocarboxylic acid | 0.1-10 | 0.5-5 | 0.75-2.25 |
| Sodium Hydroxide, liquid (50%) | 0-60 | 1-40 | 2-20 |
| Sodium Hydroxide, beads | 0-99 | 2-75 | 10-60 |
| Water | Balance | Balance | Balance |

TABLE 1-continued

Exemplary Compositions

| Component | Range (Wt %) | Range (Wt %) | Range (Wt %) |
|---|---|---|---|
| Ethylene Oxide-Propylene Oxide block copolymer | 0-3 | 0.5-2 | 0.75-1.75 |
| Sodium Sulfate, anhydrous | 0-50 | 2-30 | 5-20 |
| Sodium Carbonate | 0-99 | 5-75 | 10-45 |
| Complexing Agent | 0.1-50 | 1-40 | 10-30 |

The concentrate compositions of the present invention can be provided as a solid, powder, liquid, or gel, or a combination thereof. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms "capsule" and "pellet" are used for exemplary purposes and are not intended to limit the delivery mode of the invention to a particular shape.

When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning.

In another embodiment, the solid concentrate composition can be diluted through dispensing equipment whereby water is sprayed at the solid block forming the use solution. The water flow is delivered at a relatively constant rate using mechanical, electrical, or hydraulic controls and the like. The solid concentrate composition can also be diluted through dispensing equipment whereby water flows around the solid block, creating a use solution as the solid concentrate dissolves. The solid concentrate composition can also be diluted through pellet, tablet, powder and paste dispensers, and the like.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

It is expected that the concentrate will be diluted with the water of dilution in order to provide a use solution having a desired level of detersive properties. If the use solution is required to remove tough or heavy soils, it is expected that the concentrate can be diluted with the water of dilution at a weight ratio of at least 1:1 and up to 1:8. If a light duty cleaning use solution is desired, it is expected that the concentrate can be diluted at a weight ratio of concentrate to water of dilution of up to about 1:2000.

In an alternate embodiment, the cleaning compositions may be provided as a ready-to-use (RTU) composition. If the cleaning composition is provided as a RTU composition, a more significant amount of water is added to the cleaning composition as a diluent. When the concentrate is provided as a liquid, it may be desirable to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little water as possible in order to reduce transportation costs, it is also desirable to provide a concentrate that can be dispensed accurately. In the case of a liquid concentrate, it is expected that water will be present in an amount of up to about 90 wt %, particularly between about 20 wt % and about 85 wt %, more particularly between about 30 wt % and about 80 wt. % and most particularly between about 50 wt % and about 80 wt %.

Compositions of the invention may be useful to clean a variety of surfaces. Invention compositions may be used to clean soils on hard surfaces including but not limited to ceramics, ceramic tile, grout, granite, concrete, mirrors, enameled surfaces, metals including aluminum, brass, stainless steel and the like. Compositions of the invention may also be used to clean soiled linens such as towels, sheets, and nonwoven webs. As such, compositions of the invention are useful to formulate hard surface cleaners, laundry detergents, oven cleaners, hand soaps, automotive detergents, and warewashing detergents whether automatic or manual.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used

Acusol 445N (45%): an acrylate polymer having a molecular weight of about 4,500 g/mol, available from Dow Chemical Company, Midland, Mich.

Acusol 445ND: a solid acrylate polymer having a molecular weight of about 4,500 g/mol, available from Dow Chemical Company, Midland, Mich.

Sokalan PA40 (35%): an acrylate polymer having a molecular weight of about 15,000 g/mol, available from BASF Corporation, Florham Park, N.J.

Acusol 448 (46%): an acrylate-maleic copolymer having a molecular weight of about 3,500 g/mol, available from Dow Chemical Company, Midland, Mich.

Acusol 505N (35%): an acrylate-maleic copolymer having a molecular weight of about 40,000 g/mol, available from Dow Chemical Company, Midland, Mich.

Sokalan CP5 (45%): an acrylate-maleic copolymer having a molecular weight of about 70,000 g/mol, available from BASF Corporation, Florham Park, N.J.

Bayhibit AM (50%): a 2-phosphonobutane-1,2,4-tricarboxylic acid, available from Mobay Chemical Co., Pittsburgh, Pa.

Pluronic N3: an ethylene oxide/propylene oxide block copolymer, available from BASF Corporation, Florham Park, N.J.

Beaker Test

As an initial test to determine the ability of solutions to control water hardness, a hardness solution and a sodium bicarbonate solution were first prepared. The hardness solution was prepared by dissolving about 33.45 grams of $CaCl_2.2H_2O + 23.24$ grams of $MgCl_2.6H_2O$ in a 1 liter volumetric flask and diluting to volume with deionized water. The sodium bicarbonate solution was prepared by dissolving about 56.25 grams of $NaHCO_3.2H_2O$ in a 1 liter volumetric flask and diluting to volume with deionized water.

After the solutions were prepared, about 1000 (milliliters) of deionized water and a 1.5 inch stir bar was added to each of four beakers. The beakers were placed on stirrers and heated. About 5.0 mls of sodium bicarbonate solution was then added to each beaker. When the temperature of the solutions in the beakers reached about 85° F., a pre-determined volume (1 ml = 2 grains) of hardness solution was added to each of the beakers. The hardness solution was added in increments of 2 grains unless otherwise specified.

A pre-determined amount of test solution was added to each beaker, equaling about 1000 ppm. After the solutions in the beakers were completely mixed, the stirrer was turned to low speed.

When the temperature of the solutions again reached about 85° F., an initial transmittance reading was taken (0 minutes). Transmittance readings were then taken at 560 nm, at 85° F., 140° F. and 160° F. Generally, the higher the transmittance reading, the more clear the solution, indicating that calcium carbonate did not precipitate into solution.

Samples 1, 2, 3, 4, 5, 6 and 7

Samples 1, 2, 3, 4, 5, 6 and 7 included varying concentrations of an acrylate-maleic copolymer having a molecular weight of about 40,000 g/mol. In particular, the samples were prepared by first mixing about 97.14 grams of deionized water and about 2.86 grams of Acusol 505N and then making the appropriate dilution.

Table 2 shows the concentration and transmittance readings at 85° F., 140° F. and 160° F. of each of Samples 1-7. The appearance of each of the solutions was also noted.

TABLE 2

| Sample | Concentration (ppm) | Transmittance Reading (%) | | |
|---|---|---|---|---|
| | | 85° F. | 140° F. | 160° F. |
| 1 | 2.5 | 97.0; clear | 76.6; cloudy | 69.5; cloudy |
| 2 | 5 | 94.6; v. slight haze | 83.1; v. hazy | 82.9; v. hazy |
| 3 | 8 | 89.9; v. slight haze | 80.9; v. hazy | 81.1; v. hazy |
| 4 | 10 | 91.7; v. slight haze | 76.5; cloudy | 76.3; cloudy |
| 5 | 15 | 92.8; v. slight haze | 77.2; v. hazy | 76.9; cloudy |
| 6 | 20 | 87.5; slight haze | 71.2; cloudy | 70.4; cloudy |
| 7 | 30 | 91.0; v. slight haze | 76.6; cloudy | 75.5; cloudy |

After taking the transmittance readings, the beakers were allowed to cool down. The solutions were then poured out and the beakers were rinsed with deionized water. All of the beakers had precipitation on the bottom.

The beakers were then set upside-down to dry to check for adhering precipitation on the beakers. The next day, a few drops of dilute HCl were put into the beakers. All of the solutions except for the 8 ppm solution (Sample 3) had visible carbonate residue and slight bubbling with the addition of the HCl, indicating the presence of carbonate.

As can be seen in Table 2, the transmittance readings were highest when the concentration of the acrylate-maleic copolymer was between about 5 ppm and 30 ppm, and particularly at about 5 ppm and 8 ppm. Although the solutions had relatively high transmittance readings at 10 ppm, 20 ppm and 30 ppm, the solutions turned cloudy between 85° F. and 140° F. Similarly the solution including about 15 ppm of acrylate-maleic copolymer turned cloudy between 140° F. and 160° F.

Samples 8, 9, 10, 11, 12, 13 and 14

Samples 8, 9, 10, 11, 12, 13 and 14 included varying concentrations of an acrylate polymer having a molecular weight of about 4,500 g/mol (Acusol 445N), an acrylate-maleic copolymer having a molecular weight of about 40,000 g/mol (Acusol 505N) and a phosphonocarboxylic acid (Bayhibit AM). In particular, the samples were prepared by mixing 97.14 grams of deionized water and 2.86 grams of Acusol 505N, mixing 97.78 grams of deionized water and 2.22 grams of Acusol 445N and mixing 98.0 grams of deionized water and 2.0 grams of Bayhibit AM.

Because the results of Samples 1-7 illustrated that solutions including either 5 ppm or 8 ppm acrylate-maleic copolymer produced the highest transmittance levels, Samples 8-14 included either 5 ppm or 8 ppm acrylate-maleic copolymer. The amount of acrylate polymer was also varied. The amount of phosphonocarboxylic acid remained constant at 8 ppm.

Table 3 shows the component concentrations and transmittance readings at 85° F., 140° F. and 160° F. of each of Samples 8-14. The appearances of the solutions were also noted.

TABLE 3

| Sample | Component | Concentrations (ppm) | Transmittance Reading (%) | | |
|---|---|---|---|---|---|
| | | | 85° F. | 140° F. | 160° F. |
| 8 | Acusol 505N | 5 | 98.2; clear | 94.1; slight haze | 91.5; slight haze |
| | Bayhibit AM | 8 | | | |
| | Acusol 445N | — | | | |
| 9 | Acusol 505N | 5 | 98.3; clear | 96.0; v. slight haze | 90.8; slight haze |
| | Bayhibit AM | 8 | | | |
| | Acusol 445N | 10 | | | |
| 10 | Acusol 505N | 8 | 96.6; v. slight haze | 92.5; slight haze | 89.7; hazy |
| | Bayhibit AM | 8 | | | |
| | Acusol 445N | 10 | | | |

TABLE 3-continued

| Sample | Component | Concentrations (ppm) | Transmittance Reading (%) 85° F. | 140° F. | 160° F. |
|---|---|---|---|---|---|
| 11 | Acusol 505N | 5 | 96.4; v. slight haze | 95.0; slight haze | 91.5; slight haze |
|  | Bayhibit AM | 8 | | | |
|  | Acusol 445N | 20 | | | |
| 12 | Acusol 505N | 8 | 97.9; v. slight haze | 95.2; slight haze | 90.4; hazy |
|  | Bayhibit AM | 8 | | | |
|  | Acusol 445N | 20 | | | |
| 13 | Acusol 505N | 5 | 97.2; v. slight haze | 96.1; v. slight haze | 90.1; hazy |
|  | Bayhibit AM | 8 | | | |
|  | Acusol 445N | 30 | | | |
| 14 | Acusol 505N | 8 | 97.3; v. slight haze | 95.9; slight haze | 89.9; hazy |
|  | Bayhibit AM | 8 | | | |
|  | Acusol 445N | 30 | | | |

After taking the transmittance readings and allowing the beakers to cool down, all of the solutions were poured out and the beakers were rinsed with deionized water. All of the beakers had precipitation at the bottom of the beakers.

The beakers were then set upside-down to dry to check for precipitation on the beakers. The next day, a few drops of dilute HCl were put into the beakers. All of the solutions had visible carbonate residue and slight bubbling with the addition of the HCl, indicating the presence of carbonate.

As illustrated in Table 3, all of the Samples had transmittance readings of 89. % or higher. In particular, Samples 9, 11, 12, 13 and 14 produced transmittance readings of at least 96%, 95%, and 90% at 85° F., 140° F. and 160° F., respectively.

Samples 15, 16, 17, 18 and 19

After determining from Samples 8-14 that compositions including between about 5 ppm and about 8 ppm of acrylate-maleic copolymer and higher levels of acrylate polymer yielded high transmittance rates, a plurality of compositions were formed with varying amounts of acrylate-maleic copolymer and phosphonocarboxylic acid and generally higher concentrations of acrylate polymer.

Samples 15, 16, 17, 18 and 19 included varying concentrations of an acrylate polymer having a molecular weight of about 4,500 g/mol (Acusol 445N), an acrylate-maleic copolymer having a molecular weight of about 40,000 g/mol (Acusol 505N) and a phosphonocarboxylic acid (Bayhibit AM). In particular, the samples were prepared by first mixing 97.14 grams of deionized water and 2.86 grams of Acusol 505N, mixing 97.78 grams of deionized water and 2.22 grams of Acusol 445N and mixing 98.0 grams of deionized water and 2.0 grams of Bayhibit AM.

Table 4 shows the component concentration and transmittance readings at 85° F., 140° F. and 160° F. for each of Samples 15-19. The appearances of the solutions were also noted.

TABLE 4

| Sample | Component | Concentrations (ppm) | Transmittance Reading (%) 85° F. | 140° F. | 160° F. |
|---|---|---|---|---|---|
| 15 | Acusol 505N | 5 | 99.3; clear | 97.3; slight haze | 96.1; slight haze |
|  | Bayhibit AM | 8 | | | |
|  | Acusol 445N | 40 | | | |
| 16 | Acusol 505N | 5 | 98.6; clear | 96.9; v. slight haze | 93.5; slight haze |
|  | Bayhibit AM | 6 | | | |
|  | Acusol 445N | 40 | | | |
| 17 | Acusol 505N | 5 | 96.9; v. slight haze | 95.6; slight haze | 89.6; hazy |
|  | Bayhibit AM | 6 | | | |
|  | Acusol 445N | 30 | | | |

TABLE 4-continued

| Sample | Component | Concentrations (ppm) | Transmittance Reading (%) 85° F. | 140° F. | 160° F. |
|---|---|---|---|---|---|
| 18 | Acusol 505N | 7 | 99.0; clear | 97.7; v. slight haze | 95.3; slight haze |
|  | Bayhibit AM | 8 | | | |
|  | Acusol 445N | 40 | | | |
| 19 | Acusol 505N | 8 | 99.4; clear | 98.3; v. slight haze | 96.1; slight haze |
|  | Bayhibit AM | 8 | | | |
|  | Acusol 445N | 40 | | | |

After taking the transmittance readings and allowing the beakers to cool down, all of the solutions were poured out and the beakers were rinsed with deionized water. All of the beakers had precipitation at the bottom of the beakers, although the precipitation of the beakers that contained 8 ppm Bayhibit (Samples 15, 18 and 19) was lighter.

The beakers were then set upside-down to dry to check for precipitation on the beakers. The next day, a few drops of dilute HCl were put into the beakers. All of the solutions had visible carbonate residue and slight bubbling with the addition of the HCl, indicating the presence of carbonate. Sample 19 had almost no residual or fizzing.

As can be seen in Table 4, again all of the samples resulted in transmittance readings of at least 89.5%. However, Samples 15 and 19 produced the highest transmittance readings, yielding transmittance readings of at least 99%, 97% and 95% at 85° F., 140° F. and 160° F., respectively. Overall, Sample 15, which included 40 ppm acrylate polymer, 8 ppm phosphonocarboxylic acid and 5 ppm acrylate-maleic copolymer, yielded the highest transmittance levels.

Samples 20 and 21

Based on the results of Samples 15-19, Samples 20 and 21 were formulated, varying only the amount of phosphonocarboxylic acid.

Samples 20 and 21 included varying concentrations of an acrylate polymer having a molecular weight of about 4,500 g/mol (Acusol 445N), an acrylate-maleic copolymer having a molecular weight of about 40,000 g/mol (Acusol 505N) and a phosphonocarboxylic acid (Bayhibit AM). In particular, the samples were prepared by first mixing 97.14 grams of deionized water and 2.86 grams of Acusol 505N, mixing 97.78 grams of deionized water and 2.22 grams of Acusol 445N and mixing 98.0 grams of deionized water and 2.0 grams of Bayhibit AM.

Table 5 shows the component concentration and transmittance readings at 85° F., 140° F. and 160° F. of each of Samples 20 and 21. The appearance of each of the solutions was also noted.

TABLE 5

| | Component | Concentrations (ppm) | Transmittance Reading (%) 85° F. | 140° F. | 160° F. |
|---|---|---|---|---|---|
| Sample 20 | Acusol 505N | 5 | 99.5; clear | 97.0; v. slight haze | 96.2; slight haze |
|  | Bayhibit AM | 10 | | | |
|  | Acusol 445N | 40 | | | |
| Sample 21 | Acusol 505N | 5 | 99.7; clear | 97.3; v. slight haze | 94.8; slight haze |
|  | Bayhibit AM | 12 | | | |
|  | Acusol 445N | 40 | | | |

After taking the transmittance readings and allowing the beakers to cool down, all of the solutions were poured out and the beakers were rinsed with deionized water. All of the beakers had precipitation at the bottom of the beakers.

The beakers were then set upside-down to dry to check for precipitation on the beakers. The next day, a few drops of dilute HCl were put into the beakers.

A glass vial containing Samples 20 and 21 were then put in ovens heated to about 160° F. for about 2 hours and 40 minutes to simulate the conditions of a washing machine. After removing the vials from the oven, the vials did not have residue sticking to the sides.

The results in Table 5 show that compositions including either 10 ppm or 12 ppm phosphonocarboxylic acid yield high transmittance readings. Although Sample 21 produced slightly higher transmittance readings at the low and intermediate temperature, Sample 20 had a slightly higher transmittance reading at 160° F. However, the differences between the transmittance readings of the two samples did not exceed 2% at any of the temperatures. When the results from Samples 20 and 21 were compared to the results for Sample 15 (Table 4), it is clear that an increase in the phosphonocarboxylic acid concentration did not improve the results.

100 Cycle Warewash Test

A 100 cycle warewash test was performed using six 10 oz. Libbey glasses and one plastic tumbler to determine the film accumulation on the glasses and plastic tumbler after washing in an institutional warewash machine. The tests were performed on a Hobart AM-14 warewash machine using either 10 or 17 grain water (1 grain=17 ppm). The washbath volume was 60 L, the rinse volume was 4.5 L, the wash time was 40 seconds and the rinse time was 9 seconds with a 4 second dwell time between the wash and rinse cycle.

6 Libbey glasses were prepared by removing all film and foreign material from the surfaces of the glasses. The plastic tumbler was new and thus did not need to be cleaned prior to testing. The dishmachine was then filled with an appropriate amount of water and the water was tested for hardness. After recording the water hardness value, the tank heaters were turned on. The dishmachine was then turned on and wash/rinse cycles were run through the machine until a wash temperature of between about 150° F. and about 160° F. and a rinse temperature of between about 175° F. and about 190° F. were reached. The controller was then set to dispense an appropriate amount of detergent into the wash tank. The solution in the wash tank was titrated to verify detergent concentration.

The 6 clean glasses were placed diagonally in a Raburn rack and one plastic tumbler was placed off-diagonally in the Raburn rack (see FIGURE below for arrangement) and the rack was placed inside the dishmachine. (P=plastic tumbler; G=glass tumbler).

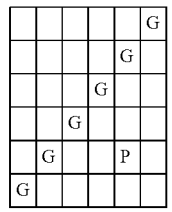

The 100 cycle test was then started. At the beginning of each wash cycle, the appropriate amount of detergent was automatically dispensed into the warewash machine to maintain the initial detergent concentration. The detergent concentration was controlled by conductivity.

At the completion of each cycle, the proper amount of detergent was dispensed into the warewash machine to maintain the initial concentration. Upon completion of 100 cycles, the rack was removed from the warewash machine and the glasses and plastic tumbler were allowed to dry overnight.

The glasses and plastic tumbler were then graded for film accumulation using a strong light source. This method is used to estimate the amount of spots and films on the glasses and plastic tumblers using a scale of 1 to 5. A rating of 1 indicated no films. A rating of 2 indicated a trace amount of film that was barely perceptible under intense spot light conditions. A rating of 3 indicated a light film was present when held up to a florescent light source. A rating of 4 indicated that a medium amount of film was present such that the surface appeared hazy when held up to a florescent light source. A rating of 5 indicated that a heavy amount of filming was present such that the surface appears cloudy when held up to a florescent light source.

The ratings of the glasses were averaged to determine an average glass rating. Generally, a composition is considered effective if the tested glasses and plastic tumbler receive a visual rating of about 3.5 or less using 17 GPG water and about 2.5 or less using 10 GPG water.

Lightbox Test

The glasses were also evaluated using a lightbox. The lightbox test standardizes the evaluation of the glasses and plastic tumbler run in the 100 cycle test using an analytical method. The lightbox test is based on the use of an optical system including a photographic camera, a lightbox, a light source and a light meter. The system is controlled by a computer program (Spot Advance and Image Pro Plus).

To evaluate the glasses, each glass was placed on the lightbox resting on its side and the intensity of the light source was adjusted to a predetermined value using a light meter. The conditions of the 100 cycle test were entered into the computer. A picture of the glass was taken with the camera and saved on the computer for analysis by the program. The picture was analyzed using the upper half of the glass in order to avoid the gradient of darkness on the film from the top of the glass to the bottom of the glass, based on the shape of the glass.

Generally, a lower lightbox rating indicates that more light was able to pass through the glass. Thus, the lower the lightbox rating, the more effective the composition was at preventing scaling on the surface of the glass. A composition is considered effective if the tested glass received a lightbox rating of about 40,000 or less using 17 GPG water and about 25,000 or less using 10 GPG water.

Examples 1, 2, 3, 4, 5, 6, 7, 8, 9, and 10 and Comparative Example A

Examples 1, 2, 3, 4, 5, 6, 7, 8, 9 and 10 are compositions of the present invention, with component concentrations (in weight percent) of sodium hydroxide (liquid and solid forms), water, an acrylate polymer (Acusol 445N, 445ND or Sokalan PA40), an acrylate-maleic copolymer (Acusol 505N, Acusol 448 or Sokalan CP5), a phosphonocarboxylic acid (Bayhibit AM), a surfactant (Pluronic N3), sodium sulfate and sodium carbonate (soda ash or dense ash), as provided in Table 6. During processing, the mixture was kept at a temperature of between about 160° F. and about 170° F. The product was then chilled in a freezer for a minimum of about 1 hour.

The composition of Comparative Example A included a known cleaning composition, Solid Power, available from Ecolab Inc., St. Paul, Minn.

The water used in testing the compositions of Examples 1, 2, 3, 4, 5, 6, 7, 8, 9 and 10 and Comparative Example A was 17 grains per gallon (GPG) water. Using 17 GPG water allowed for observation of differences after only 100 cycles or less.

Table 6 provides the component concentrations for the compositions of Examples 1, 2, 3, 4, 5, 6, 7, 8, 9 and 10.

TABLE 6

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| | Concentration (wt %) | | | | | | | | | |
| Acusol 505N (35%) | 1.430 | 1.430 | 1.430 | 1.430 | 1.430 | 1.430 | 0.000 | 0.000 | 0.000 | 0.000 |
| Acusol 448 | 0.000 | 0.000 | 0.000 | 0.000 | 0.000 | 0.000 | 1.090 | 0.000 | 1.090 | 0.000 |
| Sokalan CP5 | 0.000 | 0.000 | 0.000 | 0.000 | 0.000 | 0.000 | 0.000 | 1.250 | 0.000 | 1.250 |
| Acusol 445N (45%) | 0.000 | 0.000 | 8.900 | 8.900 | 8.900 | 0.000 | 0.000 | 0.000 | 8.900 | 8.900 |
| Acusol 445ND | 4.500 | 4.500 | 0.000 | 0.000 | 0.000 | 0.000 | 0.000 | 0.000 | 0.000 | 0.000 |
| Sokalan PA40 | 0.000 | 0.000 | 0.000 | 0.000 | 0.000 | 11.4 | 11.400 | 11.400 | 0.000 | 0.000 |
| Bayhibit AM | 1.600 | 3.200 | 3.200 | 6.400 | 1.600 | 1.600 | 1.600 | 1.600 | 1.600 | 1.600 |
| Sodium Hydroxide, liquid (50%) | 10.000 | 10.000 | 10.000 | 8.000 | 10.000 | 9.000 | 9.000 | 8.000 | 8.000 | 9.000 |
| Sodium Hydroxide, beads | 28.000 | 28.000 | 28.000 | 29.000 | 28.000 | 28.000 | 28.000 | 28.000 | 29.000 | 28.000 |
| Water | 4.500 | 4.500 | 0.000 | 0.000 | 1.500 | 4.000 | 4.000 | 0.000 | 0.000 | 0.000 |
| Sodium Chlorite Solution (25%) | 0.250 | 0.250 | 0.250 | 0.250 | 0.250 | 0.250 | 0.250 | 0.250 | 0.250 | 0.250 |
| Pluronic N3 | 1.200 | 1.200 | 1.200 | 1.200 | 1.200 | 1.200 | 1.200 | 1.200 | 1.200 | 1.200 |
| Sodium Sulfate, anhydrous | 14.000 | 14.000 | 14.000 | 14.000 | 14.120 | 13.120 | 13.500 | 14.300 | 17.000 | 16.800 |
| Sodium Carbonate | 34.520 | 32.920 | 33.020 | 30.820 | 33.000 | 33.000 | 33.000 | 33.000 | 33.000 | 33.000 |

Table 7 provides the visual ratings and lightbox ratings for each of the compositions of Examples 1, 2, 3, 4, 5, 6, 7, 8, 9 and 10 and Comparative Example A at 1000 ppm detergent concentration in 17 GPG water.

TABLE 7

| | Visual Rating (Glass/Plastic) | Lightbox Rating |
|---|---|---|
| Ex. 1 | 3.88/1.75 | 35273.41 |
| Ex. 2 | 3.83/2 | 29683.75 |
| Ex. 3 | 3.88/2 | 32237.35 |
| Ex. 4 | 4.17/2 | 33575.40 |
| Ex. 5 | 3.64/2.5 | 30405.28 |
| Ex. 6 | 2.42/1 | 32707.67 |
| Ex. 7 | 3.00/1 | 35820.00 |
| Ex. 8 | 3.17/1.5 | 40948.17 |
| Ex. 9 | 3.33/1.5 | 38531.50 |
| Ex. 10 | 3.17/1.5 | 39906.00 |
| Comp. Ex. A | 3.93/2.5 | 28854.29 |

As can be seen in Table 7, when the glasses and plastic tumbler were tested using 17 GPG water, all of the compositions resulted in similar visual ratings as the composition of Comparative Example A. The only exception was the composition of Example 6, which resulted in acceptable visual ratings for both the glasses and plastic tumbler. The compositions of Examples 6 and 7 resulted in the lowest overall visual scores for both the glasses and plastic tumblers.

Similarly, the compositions of Examples 1, 2, 3, 4, 5, 6, 7, 8, 9 and 10 and Comparative Example A produced acceptable lightbox ratings using 17 GPG water. The composition of Comparative Example A yielded the lowest lightbox rating. The lightbox ratings of the glasses treated with the compositions of Examples 2 and 5 were most similar to the lightbox ratings of the glasses treated with the composition of Comparative Example A, differing by only about 2.87% and about 5.38%, respectively.

Examples 2, 5, 6 and 9 and Comparative Example A

After visually inspecting the glasses and plastic tumbler treated with the compositions of Examples 1-10 using 17 GPG water, the compositions of Examples 2, 5, 6 and 9 were tested again. However, rather than using 17 GPG water, 10 GPG water was used. Using 10 GPG water provides an average level of water hardness generally found in the United States.

The composition of Comparative Example A included a known cleaning composition, Solid Power, available from Ecolab Inc., St. Paul, Minn.

Table 8 provides the visual ratings and lightbox ratings for each of the compositions of Examples 2, 5, 6 and 9 and Comparative Example A.

TABLE 8

| | Example 2 | Example 5 | Example 6 | Example 9 | Comp. Example A |
|---|---|---|---|---|---|
| Visual Rating (Glass/Plastic) | 2.5/1 | 2/2 | 1/1.5 | 1/1 | 2.21/3.5 |
| Lightbox Rating | 22330.67 | 18755.69 | 18659 | 15334.5 | 19082.84 |

As can be seen in Table 8, both the glasses and plastic tumbler treated with the compositions of Examples 2, 5, 6 and 9 had acceptable visual ratings of 2.5 or less when tested using 10 GPG water. By contrast, while glasses treated with the composition of Comparative Example A resulted in an acceptable visual rating, the plastic tumbler treated with the composition of Comparative Example A did not result in an acceptable visual rating.

The compositions of Examples 5, 6 and 9 yielded lightbox ratings similar to or lower than the composition of Comparative Example A with ratings below 25,000. All of the compositions of Examples 2, 5, 6 and 9 and Comparative Example A had acceptable lightbox ratings. In particular, the lightbox ratings of the glasses treated with the compositions of Examples 5, 6 and 9 had lower lightbox ratings than glass treated with the composition of Comparative Examples A by about 1.7%, 2.22% and 19.64%, respectively.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A water hardness controlling agent consisting essentially of:
   (a) a polyacrylic acid or salt thereof having a molecular weight of between about 1,000 and about 50,000 g/mol;
   (b) an acrylic-maleic acid copolymer or salt thereof having a molecular weight of between about 1,000 and about 100,000 g/mol; and
   (c) a phosphonocarboxylic acid or salt thereof, wherein a ratio of acrylic-maleic acid copolymer or salt thereof to polyacrylic acid or salt thereof to phosphonocarboxylic acid or salt thereof in parts per million is about 1-30:10-80:6-20.

2. The water hardness controlling agent of claim 1, wherein the ratio of acrylic-maleic acid copolymer or salt thereof to polyacrylic acid or salt thereof to phosphonocarboxylic acid or salt thereof in parts per million is about 5:40:8.

3. The water hardness controlling agent of claim 1, wherein the polyacrylic acid or salt thereof has a molecular weight of between about 1,000 and about 35,000 g/mol.

4. The water hardness controlling agent of claim 1, wherein the acrylic-maleic acid copolymer or salt thereof has a molecular weight of between about 1,000 and about 75,000 g/mol.

5. The water hardness controlling agent of claim 1, wherein the polyacrylic acid or salt thereof has a molecular weight of about 4,500 g/mol and the acrylic-maleic acid copolymer or salt thereof has a molecular weight of about 40,000 g/mol.

6. The water hardness controlling agent of claim 1, wherein the phosphonocarboxylic acid or salt thereof comprises 2-phosphonobutane 1, 2, 4 tricarboxylic acid.

* * * * *